Figure 5:
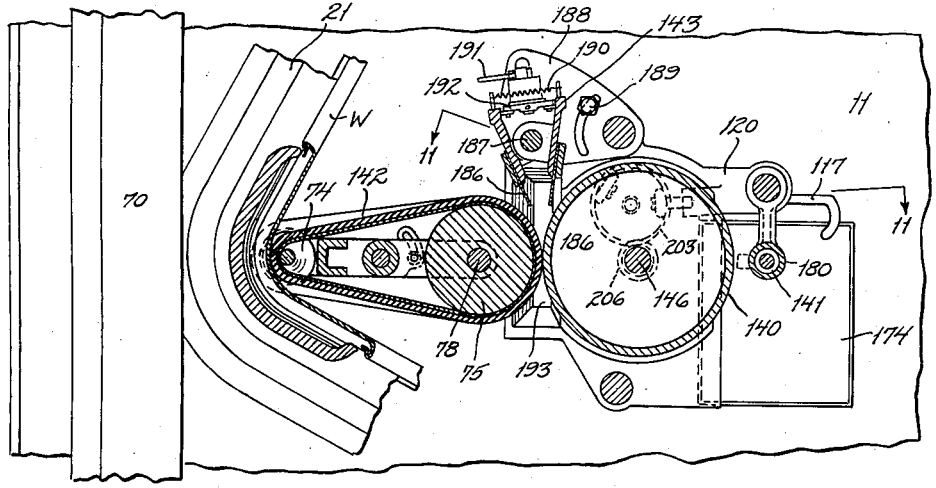

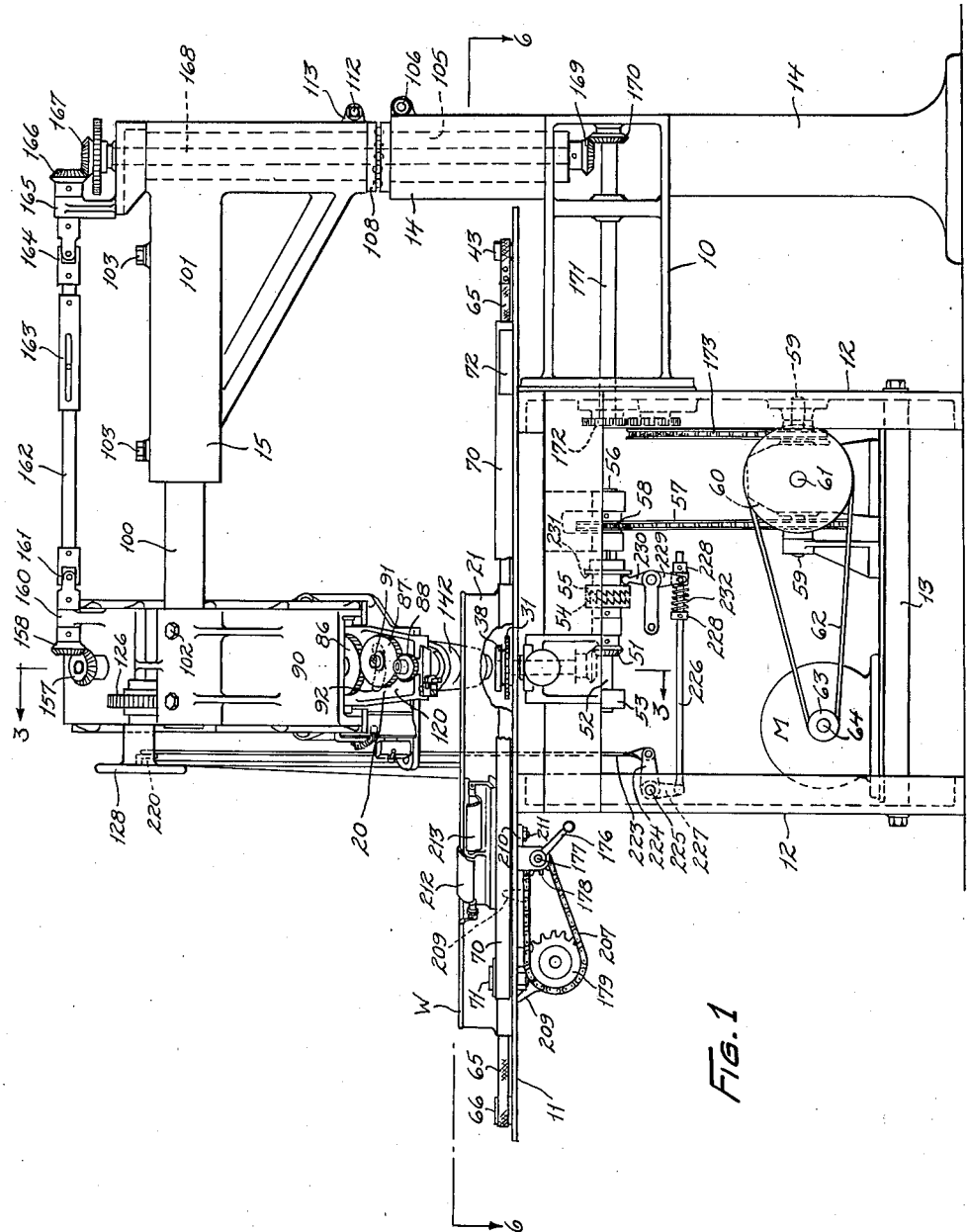

Oct. 26, 1937.  L. V. CASTO ET AL  2,096,731
APPARATUS FOR HANDLING AND DECORATING ARTICLES OF MANUFACTURE
Filed Nov. 2, 1936   11 Sheets-Sheet 2

INVENTORS
Lloyd V. Casto, Guido von Webern,
Edward W. Hamant, & Orville D. King
BY
Bates, Golrick & Teare
ATTORNEYS Oct. 26, 1937.  L. V. CASTO ET AL  2,096,731
APPARATUS FOR HANDLING AND DECORATING ARTICLES OF MANUFACTURE
Filed Nov. 2, 1936   11 Sheets-Sheet 3
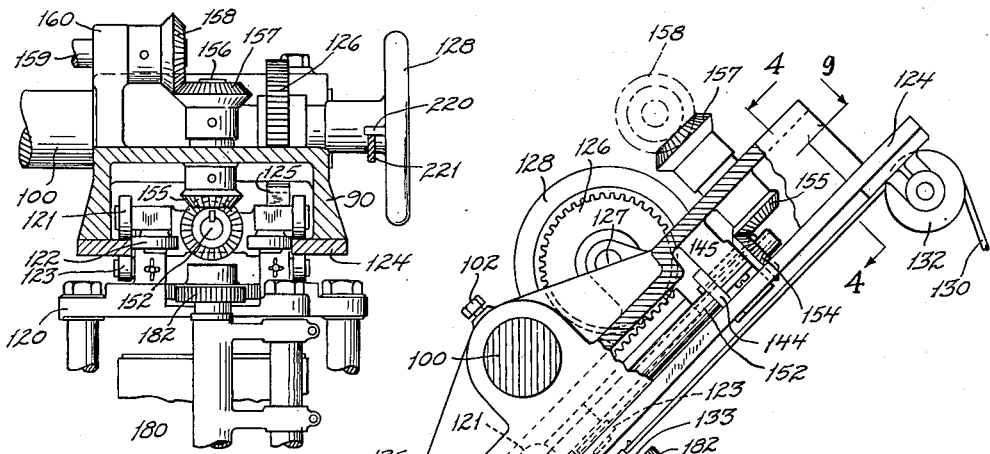
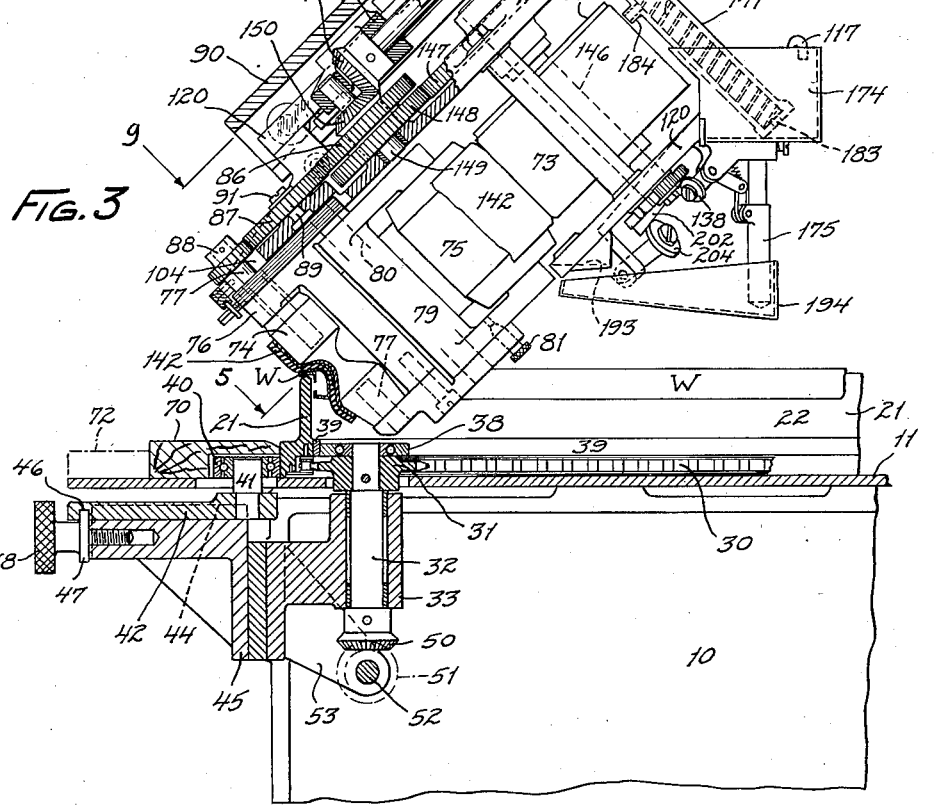
INVENTORS
Lloyd V. Casto, Guido von Webern
Edward W. Hamant, & Orville D. King
BY
Bates, Goldrick, & Teare
ATTORNEYS

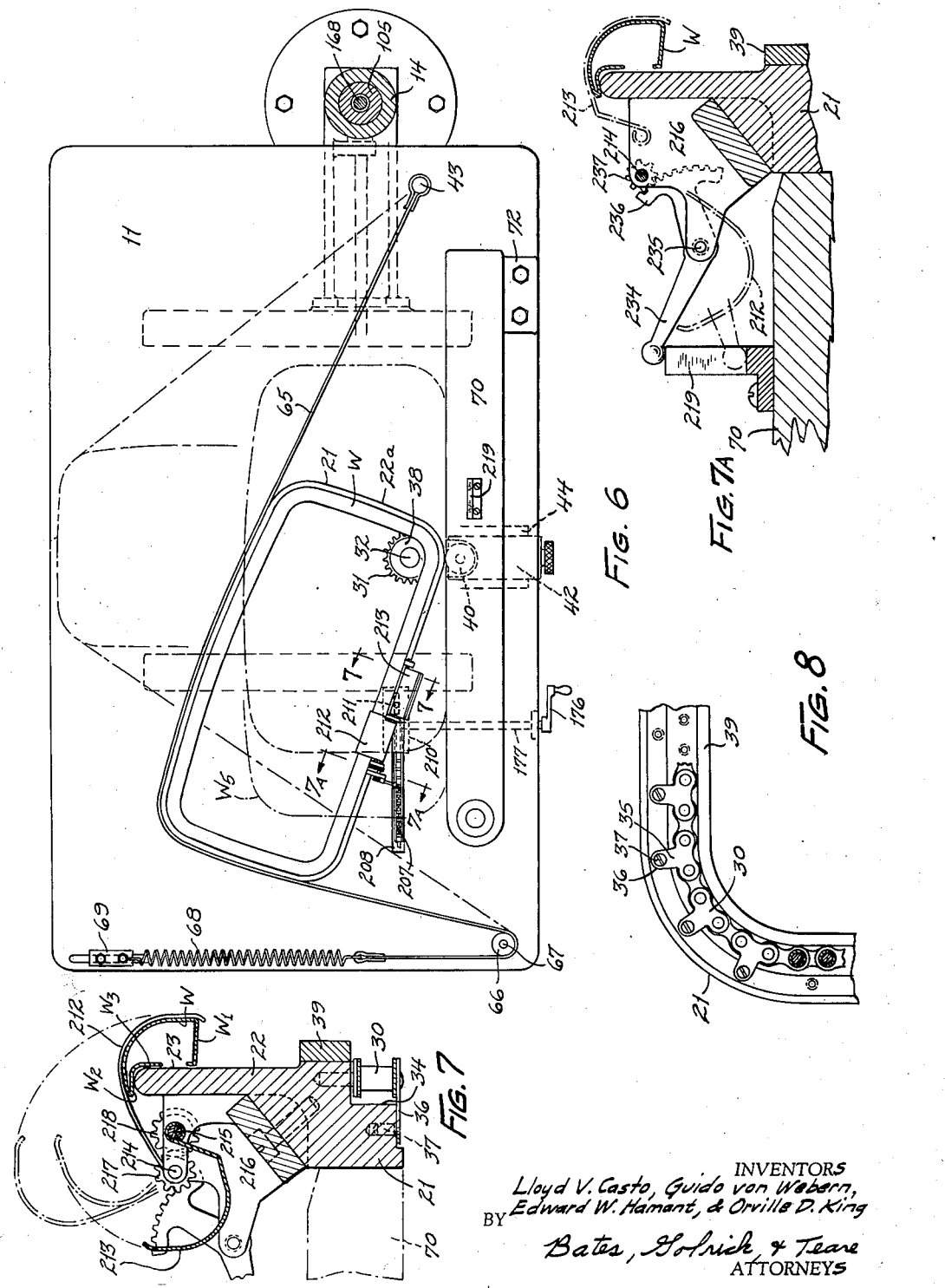

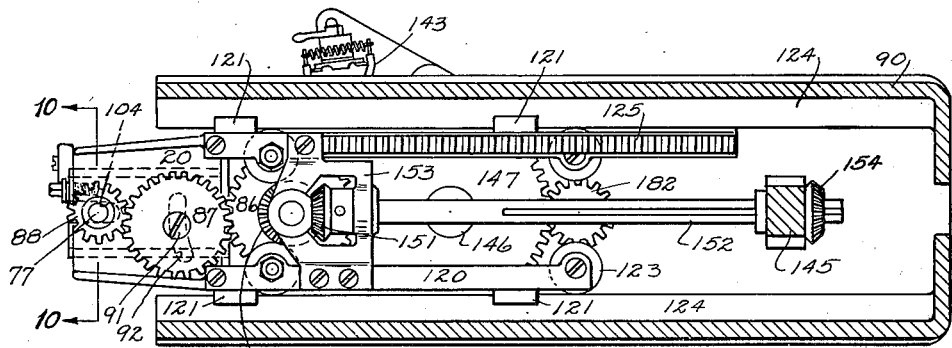
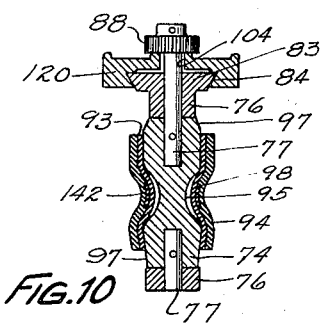
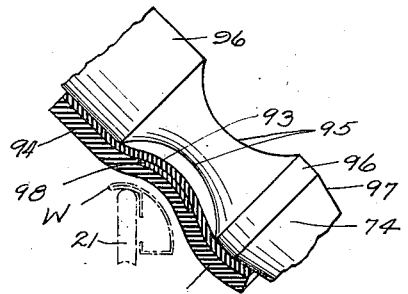
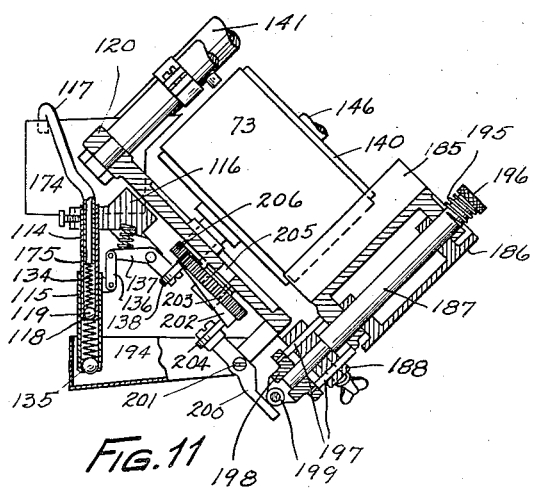
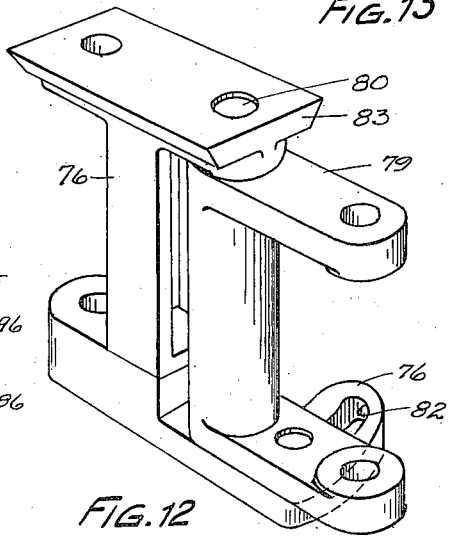

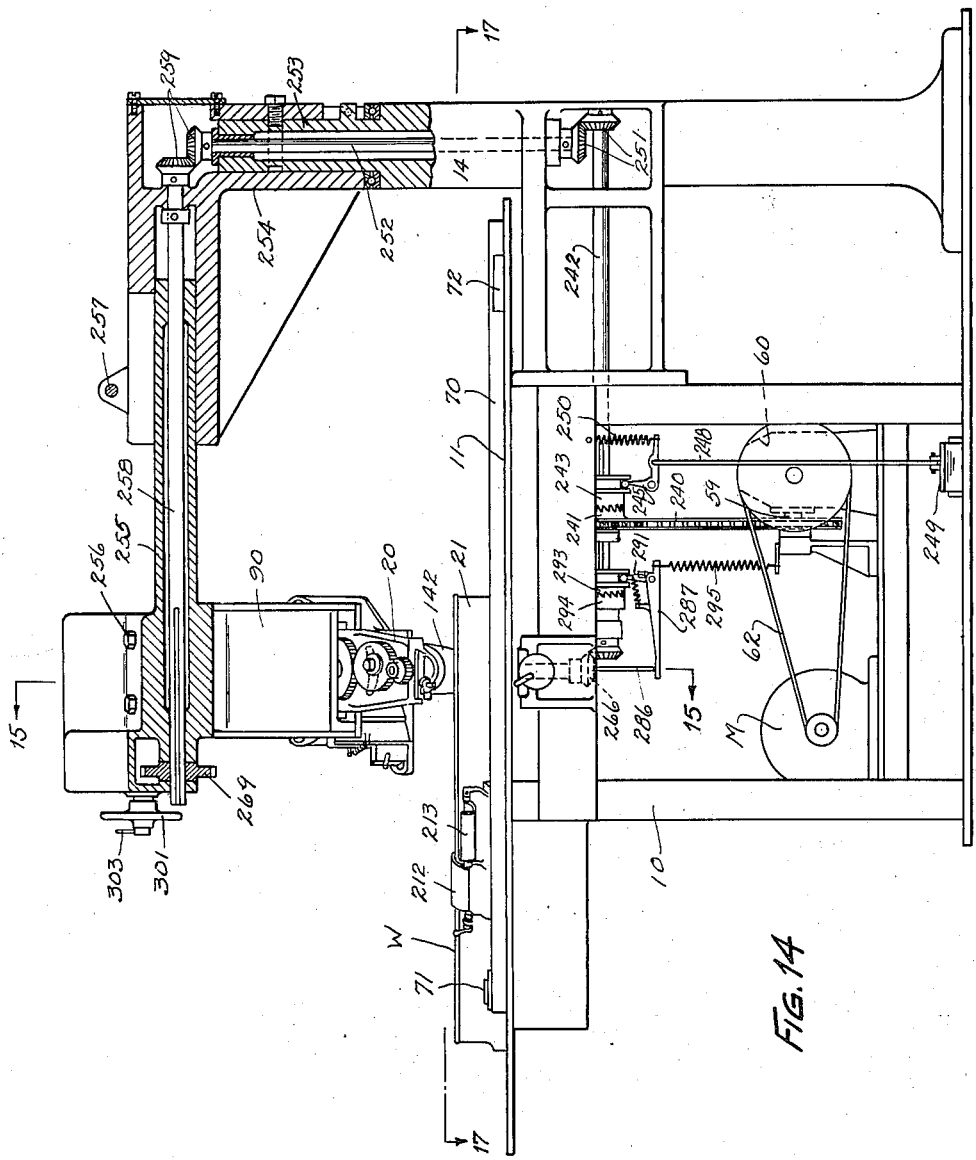

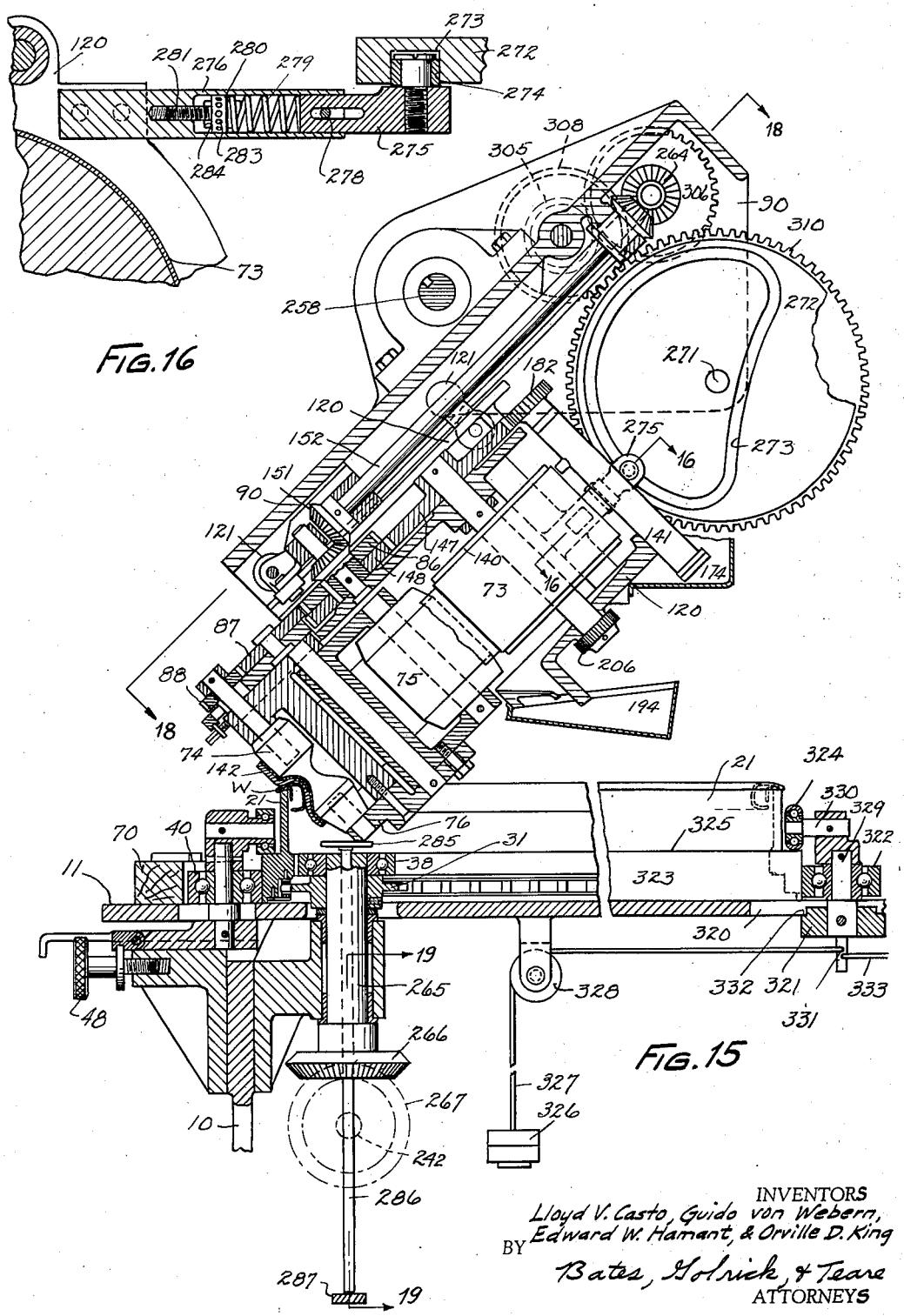

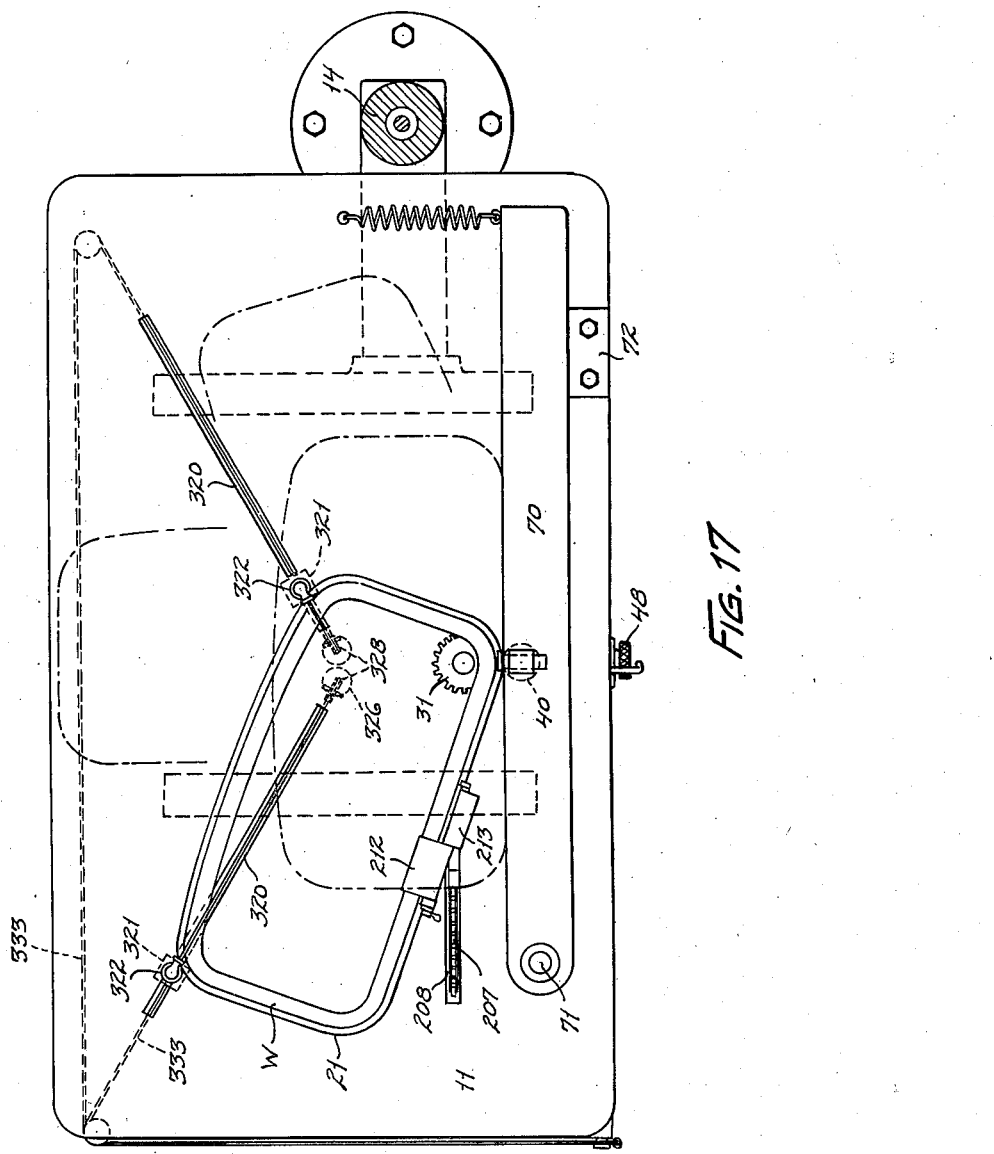

Oct. 26, 1937.     L. V. CASTO ET AL     2,096,731
APPARATUS FOR HANDLING AND DECORATING ARTICLES OF MANUFACTURE
Filed Nov. 2, 1936     11 Sheets-Sheet 11

INVENTORS
Lloyd V. Casto, Guido von Webern,
BY Edward W. Hamant, & Orville D. King Bates, Goldrick, & Teare
ATTORNEYS Patented Oct. 26, 1937

2,096,731

UNITED STATES PATENT OFFICE 2,096,731

APPARATUS FOR HANDLING AND DECORATING ARTICLES OF MANUFACTURE

Lloyd V. Casto, Detroit, Mich., and Guido von Webern, Orville Doering King, and Edward W. Hamant, Dayton, Ohio, assignors to Oxford Varnish Corporation, Detroit, Mich., a corporation of Michigan Application November 2, 1936, Serial No. 108,698

30 Claims. (Cl. 101—35)

This invention relates to an improved method and apparatus for decorating surfaces, and particularly for decorating elongated surfaces which have a transverse sectional contour deviating from a common plane. The present invention is an improvement on that shown, described and claimed in our copending application for Letters Patent filed August 29th, 1935, and assigned Serial No. 38,358. Further, the present invention also is concerned with the decoration of elongated surfaces which, prior to their decoration, have been formed into various articles of manufacture, such as window frames and the like. These, therefore, are the general objects of the present invention.

Another object of the present invention is to provide a method and apparatus for decorating the internal surfaces of open frames, such as sheet-metal automotive window frames and the like, even though the sectional contour of the surface to be decorated deviates at different points throughout the length of the frame.

Another object is to provide a method and apparatus for the application of a decorative coating to the exposed surfaces of frames, such as automotive frames, in an expeditious and economical manner and in such a way that the minor variations between the different frames of supposedly identical formations due to present-day production methods of manufacture will be compensated for in the decorating mechanism, to the end that distortion of decoration applied to such frames will be maintained at a minimum. It is likewise an object of the present invention to provide a decorating apparatus which will efficiently apply a decorative coating to articles of manufacture, so that there will be no perceptible joint in the applied design or pattern at any part of the work, and in such a manner that any unevenness in the work will be compensated for during the decorating process, to the end that distortion of the decoration will be maintained at a minimum, and retouching operations practically eliminated.

Another object of the present invention is to provide a decorating mechanism or apparatus in which an operator may position an article to be decorated, such as a frame, and which apparatus, through a conjoint positive movement or manipulation of both article to be decorated and decorating mechanism, will cause a design to be imparted to an exposed surface of an article with a minimum amount of distortion.

A further object includes the novel arrangement in a work-decorating machine, of a mechanism for supporting and positively moving the work, in such a manner that it may coact with a surface decorating mechanism to effect a decoration of the article by an offset printing mechanism. Many features of the mechanism which coact to minimize the distortion of the applied impression and to expedite the decoration of the article will be hereinafter brought out.

Likewise, other objects and features of this invention will become apparent from the following description, relating to the accompanying drawings, which show preferred forms of mechanisms for carrying out the invention. The essential features of the invention will be summarized in the claims.

Figure 19:
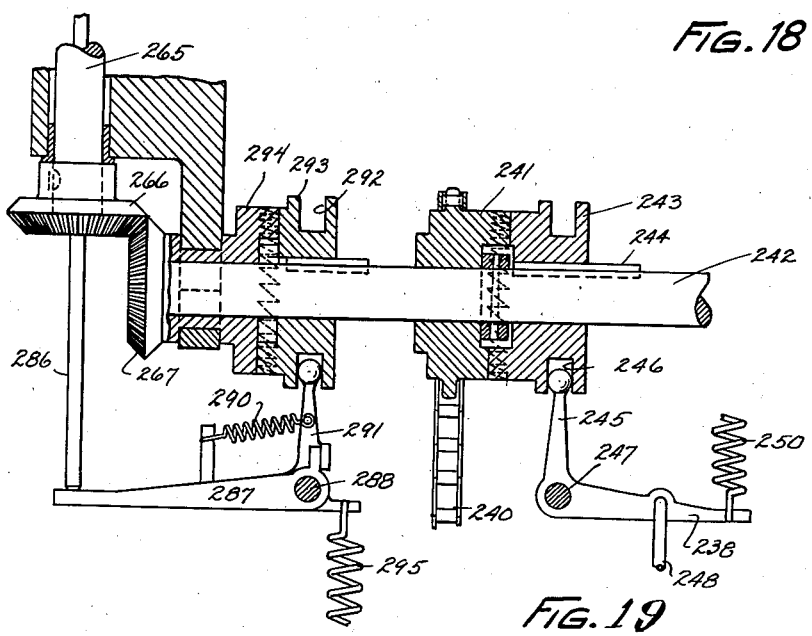
Figure 20:
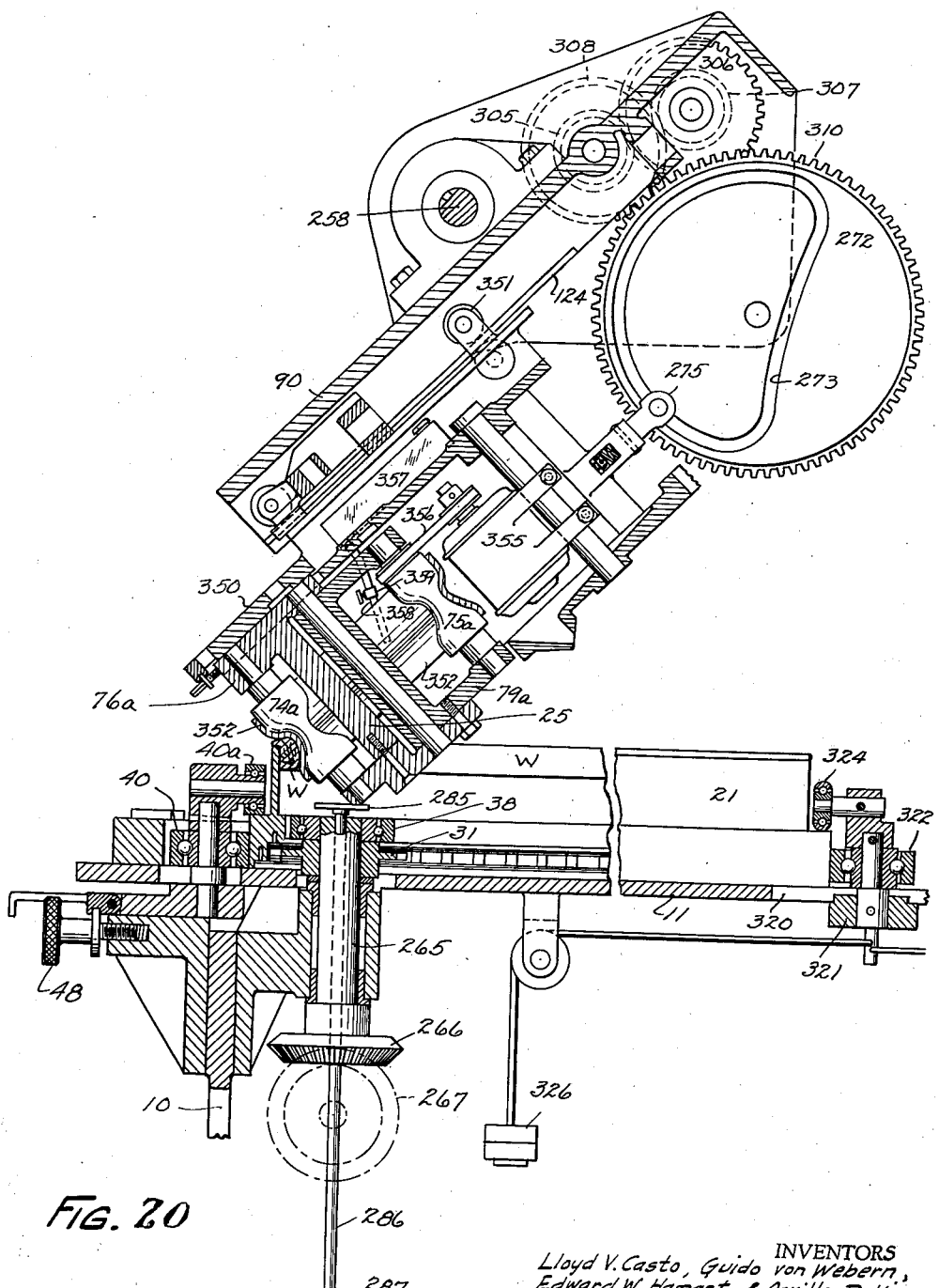

The mechanisms illustrated in the drawings have been especially adapted for the decoration of frames. The mechanism shown in the drawings is especially adaptable for the application of a decorative coating to metallic frames, such as sheet-metal automotive vehicle window frames. However, it is obvious that many other types and shapes of articles may be decorated fully, as well with the mechanism as shown (for instance, U-shaped articles, elongated strips and, indeed, an endless number of articles of manufacture, other than those having continuous surfaces, such as frames). In Figs. 1 to 19, we have shown the mechanism as adapted to apply a decorative treatment to the article to be decorated by means of an offset printing process. In Fig. 20 we have shown a modified form of the invention, which comprises the machine illustrated in Figs. 1 to 19, with printing mechanism removed and a mechanism for applying a polishing material substituted therefor. This polishing mechanism comprises a mechanism for the application of a coating of polish to an article which has been decorated by means of the mechanism shown in Figs. 1 to 19. In all forms of the invention, however, it will be noted that the work is decorated by the application of a coating thereto. Likewise the work is handled and moved in a predetermined manner by a positive driving mechanism, which cooperates in timed relationship with a decorating unit, the actual decorating member of which contacts with the work to apply a decorative coating thereto. The decorating member is positively rotated relative to the work, and in no instance is the movement of the work dependent upon the movement of the decorating member for its motive power.

Figure 2:
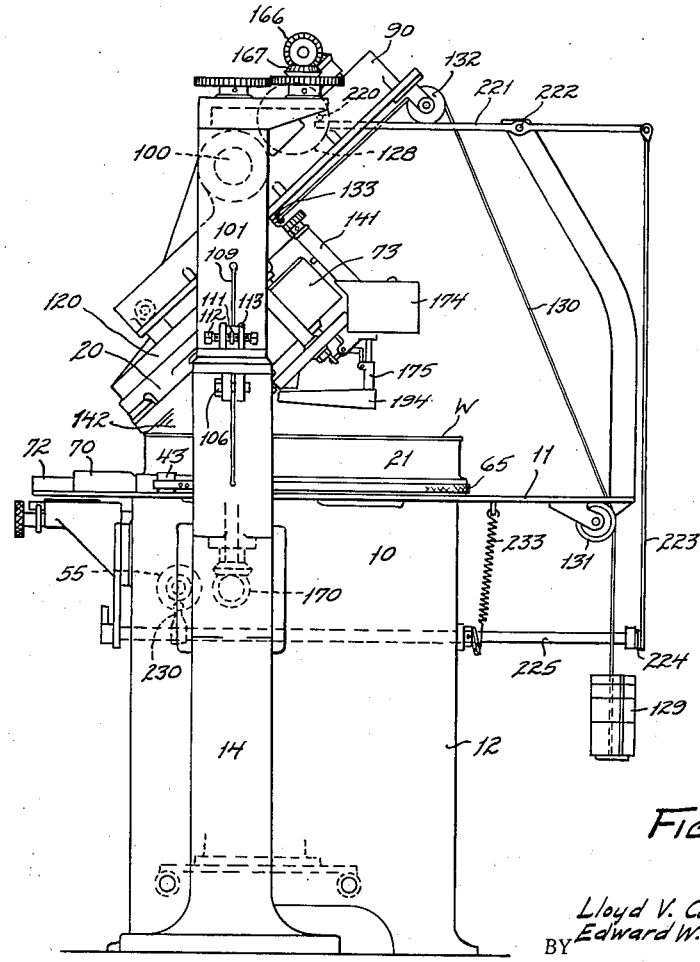
Figure 5A:
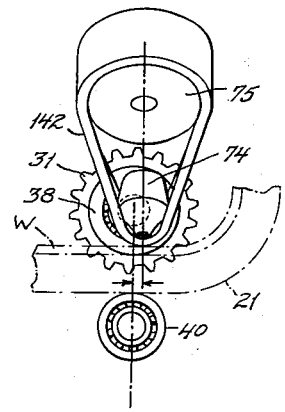
Figure 18:
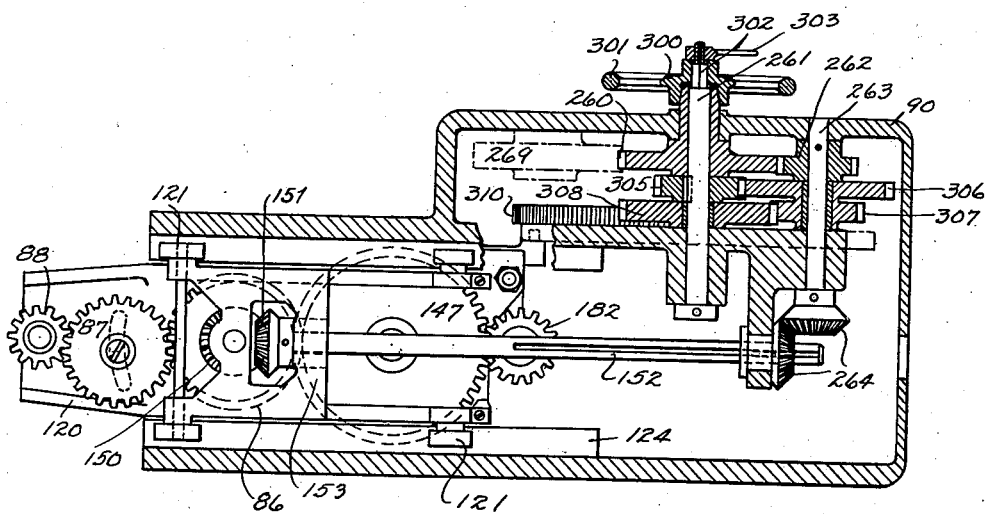
Figure 21:
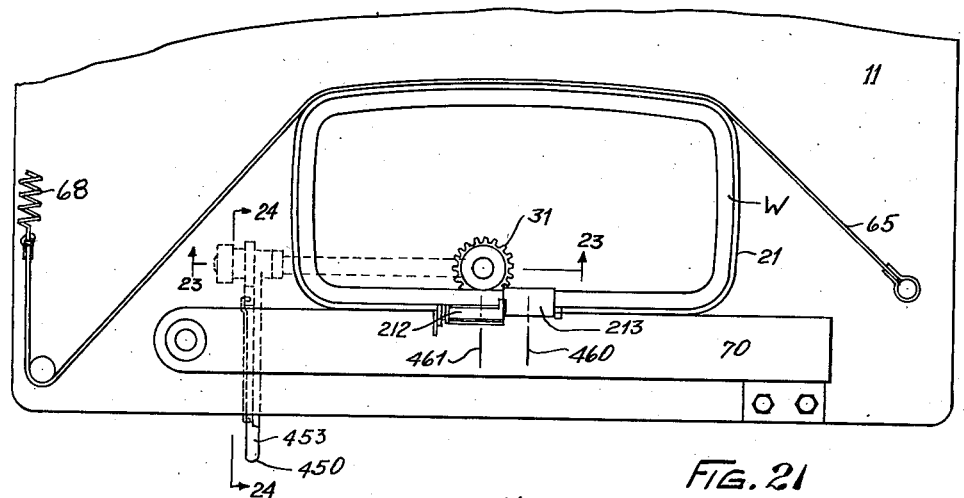
Figure 22:
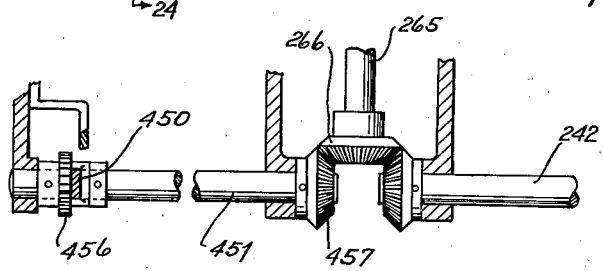
Figure 23:
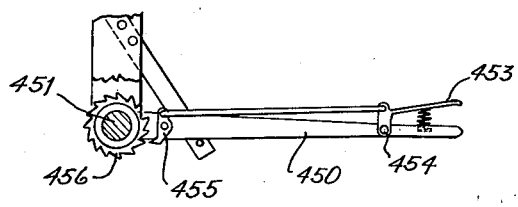

Referring now to the drawings, Fig. 1 is a front elevation of our improved surface decorating machine; Fig. 2 is a side elevation of the machine, as viewed from the right-hand side of Fig. 1; Fig. 3 is a fragmentary vertical section through the decorating unit, as indicated by the line 3—3 on Fig. 1; Fig. 4 is a transverse sectional detail, the plane of the section being indicated by the lines 4—4 on Fig. 3; Fig. 5 is a transverse sectional detail, through the decorating unit, the plane of the section being indicated by the lines 5—5 on Fig. 3; Fig. 5A is a diagrammatic illustration of the relative positions of the decorating unit and workholder guides during the decoration of the work; Fig. 6 is a horizontal section, illustrating the work-handling apparatus, the plane of the section being indicated by the lines 6—6 on Fig. 1; Figs. 7 and 7A are sectional details on a greatly enlarged scale, the plane of the sections being indicated by the lines 7—7 and 7A—7A on Fig. 6; Fig. 8 is a detail, partly in section and on a greatly enlarged scale, of a portion of the work-supporting fixture, as viewed from the bottom; Fig. 9 is a sectional detail, on the same scale as Fig. 3, the plane of the section being indicated by the lines 9—9 on Fig. 3; Fig. 10 is a section indicated by the lines 10—10 on Fig. 9; Fig. 11 is a sectional detail of a scraping apparatus for removing excess color from the pattern roll and transfer belt, the plane of the section being indicated by the offset lines 11—11 of Fig. 5; Fig. 12 is a perspective view of the brackets which carry transfer belt supporting rolls of the decorating or graining unit; Fig. 13 is a sectional view on a greatly enlarged scale, illustrating the normal relationship between the offset web and its foremost supporting roll; Fig. 14 is a front elevation of a modified form of our device, certain parts being broken away to more clearly illustrate the internal construction thereof; Fig. 15 is a section, similar to Fig. 3, but taken through the modified form shown in Fig. 14, the plane of the section being indicated by the lines 15—15 on the latter figure; Fig. 16 is a sectional detail, the plane of the section being indicated by the lines 16—16 on Fig. 15, the scale of the figure being somewhat larger than that of Fig. 15; Fig. 17 is a horizontal section, similar to Fig. 6, but taken through the modified form of the invention, illustrated in Fig. 14, the plane of the section being indicated by the lines 17—17 on Fig. 14; Fig. 18 is a section similar to Fig. 9, but taken through the modified form of the device, the plane of the section being indicated by the lines 18—18 on Fig. 15; Fig. 19 is a sectional detail on a greatly enlarged scale, the plane of the section being indicated by the lines 19—19 on Fig. 15; Fig. 20 is an illustration of a device shown in either Figures 3 or 15, arranged, however, to polish the decorated workpiece by applying a coating of polishing material thereto; Fig. 21 is a fragmentary view of a modified form of mechanism for manually driving the workholder to position the work and workholder prior to the decoration of the work; Figs. 22 and 23 are sectional details, as indicated by the correspondingly numbered lines on Fig. 21.

Referring to Figs. 1 to 13 and especially to Fig. 1, the mechanism therein shown is supported by a frame 10, provided with a bed or table 11, supported by suitable legs 12, which are interconnected by cross-frame members, such as indicated at 13. Secured to the frame 10 and rising thereabove is a vertically extending column 14, supporting a superstructure 15, as will be hereinafter more fully described. The table 11 supports the work, indicated at W, and the superstructure 15 supports a work-decorating mechanism proper, which is generally indicated at 20.

Work supporting mechanism

The table, together with the work-supporting mechanism, is best illustrated in Figs. 1, 2, 3 and 6. As there shown, the table comprises a planular surface 11, which supports a work-holding fixture 21, in such manner that the fixture is free to swing in controlled directions depending upon the shape of the work, while being positively driven. The embodiment of the invention illustrated is especially adapted for decorating the exposed surfaces of frames, such as metallic frames which are in general use at the present time in automotive vehicles. Such a frame is indicated at W in Figs. 6 and 7, and it will be noted that the frame comprises a hollow, substantially rectangular member, the cross-section of which is hollow, as indicated in Fig. 7. Generally such frames are provided with an outwardly extending clip or flange W1, which, when in use on an automotive vehicle, overhangs the frame of the body of the vehicle. As shown in the drawings, the frame is positioned on a workholder 21, with the overhanging flange W2 of the work W loosely seated on an upwardly extending portion 22 of the workholder, for purposes which will be explained. Said portion is arranged to support the work throughout its entire length, and so arranged that the inner vertically extending surface 23 of this workholder substantially engages an external vertically extending surface W3 of the work, being spaced a comparatively small distance therefrom to permit the work to float, to a small degree, in the workholder. If desired, the bottom surface of the workholder 21, may be provided with inset steel balls (not shown) to ride on the flat surface of the table and reduce the friction between the table and the workholder to a minimum.

Workholder drive

The workholder 21 is positively moved or slid across the surface of the table for purposes hereinafter described. As indicated in Figs. 3, 7 and 8, the workholder is provided with a rack 30 arranged to be engaged by a sprocket wheel 31, drivingly carried by a shaft 32 mounted in a frame bracket 33, and driven as hereinafter more fully described. The rack comprises a continuous roller chain carried in an angular recess 34, formed in the inner wall of the workholder. Certain links 35 of this roller chain are provided with outwardly extending lips 36, which are secured to the workholder by studs 37, thereby securing the chain or rack in a fixed position relative to the workholder.

The work carried by the workholder is maintained in cooperating relationship with the decorating or graining unit by a pair of rollers which engage the workholder. One of these rollers, namely, the roller 38, is rotatably mounted on the shaft 32, above the sprocket 31, and coacts with a wearing band 39, rigidly fixed to the inner wall 22 of the workholder. The workholder is maintained in contact with the roller 38, and the rack 30 is maintained in meshing engagement with the sprocket 31 by the second roller, namely, the roller 40. The roller 40 is rotatably mounted on a spindle 41 carried by a bracket 42.

The bracket 42, which supports the roller 40, as heretofore mentioned, is movably mounted on the table 11 to permit the workholder to be readily replaced, as well as to permit adjustment of the pressure of rollers on the workholder. As indicated in Fig. 3, the bracket 42 is slidable in a guideway 44, formed in a stationary frame bracket 45. The outermost end of the bracket 42 is provided with a groove 46, which is engaged by an annular flange 47 of an adjusting screw 48, which is threadingly mounted in the bracket 45.

The sprocket 31 is positively driven to progress the work. To this end the sprocket is secured to the shaft 32, to which a bevel gear 50 is also secured. The gear 50 constantly meshes with a bevel gear 51, drivingly secured (Figs. 1 and 3) to a shaft 52, journalled in suitable brackets 53 beneath the table 11. Pinned to the shaft 52 (Fig. 1) is one member 54 of a jaw clutch, the other member 55 of which is splined to a shaft 56, which, as shown in the drawings, is in axial alignment with the shaft member 52.

The shaft 56 is provided with a sprocket 58, which is connected by a drive chain 57 with the driving shaft 59 of a speed reduction unit 60, the driven shaft 61 of which is drivingly connected by a belt 62 with a pulley 63 carried by the armature shaft 64 of a motor M mounted on one of the cross-frame members 13, as indicated in Fig. 1.

Referring now to Fig. 6, wherein we have illustrated a plan view of the table and workholder, it will be noted that as the sprocket 31 progresses the workholder, the latter will swing or rock about the axis of the sprocket, and when the sprocket passes from one relatively straight line internal surface of the workholder to another such surface, and those portions of the workholder remote from the sprocket will travel faster than when the workholder progresses in substantially a straight line. At times, due to the change in the rate of travel, the workholder is apt to leave the surface of the table 11. As this would distort the design and possibly damage various parts of both the work progressing and decorating mechanism, there is provided a mechanism to coact with the workholder and maintain it in contact with the table 11. For this purpose, there is secured to the right-hand side of the table 11 (Fig. 6) a post 43, to which in turn is secured one end of a flexible belt 65. This belt frictionally engages the external surface or surfaces of the workholder adjacent the table and passes forwardly from the workholder around a pulley 66, journalled on a stud 67 carried by the table, and thence rearwardly to a spring 68, which is adjustably secured to the table by a block 69. This arrangement, due to the frictional engagement between the belt and the surface of the workholder, and the constant pressure of the belt on the workholder causes the workholder to progress smoothly and evenly.

To retard the shock of the workholder as a surface thereof, such as, for instance, surface 22a in Fig. 6, swings into a position parallel with the foremost edge of the table 11, and to maintain such edges of the workholder substantially parallel with the front edge of the table, except during such time as the workholder is swinging around the axis of the shaft 32 to enable the decoration of the internal corner of the work, the table is provided with an abutment 70. As shown in Fig. 6, the abutment 70 comprises an elongated block preferably of wood, which is pivotally mounted at its extreme left-hand end on a stud 71 carried by the table and at its right-hand edge abuts a resilient cushion, such as, for instance, a rubber block 72, as indicated in Fig. 6.

Decorating unit support

The decorating unit 20 overhangs the table 11 and is mounted to permit it to be adjusted relative to the table 11 to facilitate the decoration of various articles by the same decorating mechanism. As shown in Figs. 1, 2 and 3, the decorating unit 20 is mounted on a carriage 90, which is supported by a shaft 100, carried by a bracket 101, which is mounted on the column 14. The decorating unit is arranged to rock about the axis of the horizontally extending shaft 100 and is secured in angular position relative thereto by suitable bolts 102. The shaft 100 is in turn mounted within the bracket 101 for axial sliding movement, and when properly positioned may be secured against further axial movement by clamping bolts 103.

The decorating unit also is swingable about the vertical axis of the column 14. As shown in the drawings, the column 14 rises above the table 11 and has mounted therein an axially extending sleeve 105, which is adjustably secured to the column by suitable clamping screws 106. The sleeve 105 rises some distance above the column 14, and provides an axle about which the bracket 101, together with the decorating unit 20, may be swung as a unit. To facilitate the swinging movement of the decorating unit, there is interposed, between the upper surface of the column 14 and the lower surface of the bracket 101, an anti-friction bearing 108.

Referring now to Fig. 2, it will be noted that the bracket 101 is provided with a slot 109. Secured to the sleeve 105 and projecting outwardly through the slot 109 is an ear 111, arranged to be engaged by oppositely facing screws 112, carried by lugs 113 formed on the bracket 101. Thus, the angular position of the decorating unit relative to the axis of the sleeve 101, may be accurately adjusted by manipulation of the set screws 112.

The decorating unit 20 is mounted on the carriage 90 for movement toward and away from the table 11, that is, for movement in a direction tangential to the shaft 100, thus permitting the decorating unit to be moved substantially universally relative to the table, whereby workpieces of various sizes and shape may be conveniently decorated and also permit the decorating unit to be adjusted relative to the work to obtain the most advantageous impression.

As shown in Figs. 3 and 4, the decorating unit 20 is mounted on a frame 120, to which is secured a plurality of rollers 121, 122 and 123, arranged to engage the top, edge and bottom surfaces of a pair of gib members 124, which are secured to the carriage 90.

The mechanism is so arranged that the decorating unit may be manually positioned relative to the carriage. To this end, a rack 125 is secured to the frame of the decorating unit and is engaged by a gear 126, rigidly secured to a shaft 127, journalled in the carriage 90. This shaft is provided with a handwheel 128, to enable the operator to conveniently rotate the shaft when desired.

The decorating or graining unit is counterbalanced, as indicated in Figs. 2 and 3, by counterweights 129. These weights are secured to one end of a flexible cord 130, which passes around suitable pulleys 131 and 132, carried by the frame 10 and the carriage 90, respectively, and is attached at its other end to the frame 120, as indicated at 133.

From the foregoing it will be seen that by the use of the various adjustments described, namely, the shifting of the decorating or graining unit in the carriage 90, the movement of the carriage 90 about the axis of its supporting shaft 100, the sliding movement of such shaft in the bracket 101 and the rotative movement of the bracket about the axis of the column 14, permits substantially unlimited adjustment of the decorating unit relative to the work supported by the workholder 21.

*Decorating unit*

The decorating unit, best shown in Figs. 1 to 15 inclusive, will now be described. This form of decorating unit comprises a graining mechanism, that is, a mechanism especially adapted to transfer a design from a pattern to the work by an offset printing process.

Referring now particularly to Figs. 3 and 5, it will be noted that the graining unit is provided with a pattern cylinder 140, an inking unit 141, which supplies ink to the pattern cylinder, an offset printing member in the form of a transfer web 142, which transfers the pattern from the pattern roll 140 to the work W, together with a scraping mechanism 143, which removes the excess ink from the pattern prior to its transfer to the offset web and removes any ink remaining on the offset web subsequent to the transfer of the pattern therefrom to the work.

*Pattern cylinder and drive therefor*

The pattern cylinder is secured to a shaft 146, which is journalled in the frame 120, and is constantly rotated by the motor M. As shown, a gear 147 is secured to the pattern cylinder shaft 146 and is in constant meshing engagement with a gear 148, journalled on a stub shaft 149, carried by the frame 120. Rigidly secured to the stub shaft at its upper end is a bevel gear 150, in constant meshing engagement with a bevel gear 151, carried by a transverse extending shaft 152. At its forward end this shaft is mounted in a bracket 153, which projects upwardly from the decorating unit frame 120, and at its rearmost end is splined to a bushing 144, which is in turn journalled in a bracket member 145, depending from the carriage 90. Drivingly secured to the bushing 144 is a bevel gear 154, which is in constant meshing engagement with a bevel gear 155, rigidly secured to a relatively vertically extending shaft 156, to which is also secured a bevelled gear 157. This latter gear constantly meshes with a bevel gear 158, which is drivingly secured to a stub shaft 159, carried, as shown in Fig. 1, in a bearing 160, which projects upwardly from the carriage 90.

The shaft 159 is connected by a universal joint 161 with a shaft 162, which has a splined connection 163 with a universal joint member 164, one member of which is journalled at 165 in a bearing carried by the bracket 101. The universal joint 164 is drivingly connected to a gear 166, which is in constant meshing engagement with a gear 167. The gear 167 is drivingly secured to a shaft 168, journalled in suitable bearings within the sleeve 105. This shaft extends downward through the sleeve and is provided, at its lower end, with a gear 169, which is driven by a bevelled gear 170 secured to a shaft 171, journalled in the frame 10. This shaft is driven by the driving shaft 59 of the gear reduction unit 60, heretofore mentioned, through the medium of spur gearing 172 and a drive chain 173. Thus it will be seen, that inasmuch as both the pattern cylinder 140 and the work-progressing sprocket 31 are each positively driven from the same source of power, they will operate in timed relationship with each other.

*Inking mechanism*

The pattern cylinder 140 preferably carries an etched intaglio plate or cylinder 73 and is supplied with ink by the inking mechanism 141. This inking mechanism is shown, described and claimed in Patent No. 1,997,612, issued to our assignee, Oxford Varnish Corporation, April 16th, 1935. Briefly, this inking mechanism comprises a tube 180, in which is mounted a conveyor screw 181, the upper end of which is secured to a gear 182 arranged in constant meshing relationship with the pattern roll gear 147, heretofore described. The lower end of the tube 180 projects into a reservoir 174, and is provided with a suitable opening 183, to permit ink to be drawn upwardly by the screw from the reservoir. The tube 180 is positioned adjacent and parallel with the surface of the pattern 73, and near its upper end is provided with a port 184. The ink drawn upwardly from the reservoir 174 is thus fed out of this port, and falls downwardly along the pattern 73. An opening 139 in the tube 80 affords a pressure relief for the ink.

*Scraper mechanism*

The ink is spread and the excess removed from the cylinder 140 by the scraper mechanism 143. As shown in Fig. 5 and Fig. 11, the scraper mechanism comprises a pair of doctor blades 185 and 186, the former coacting with the pattern 73 and the latter coacting with the transfer web 142. Each of the doctor blades is mounted to swing about the axis of a relatively vertically extending supporting shaft 187, carried by a bracket 188, which is pivotally mounted on the frame 120 of the decorating unit, and adjustably secured in position relative to such frame by suitable adjusting or clamping screws 189.

Normally, the doctor blades 185 and 186 are maintained in contact with the pattern 73 and the belt 142, respectively, by a spring 190, interposed, as shown in Fig. 5, between the two blades. However, when the decorating mechanism is inactive, these blades are manually swung out of contact with their respective elements by the rocking of a lever 191, which rocks a cam 192, thereby swinging both blades out of contact with their respective coacting elements.

Excessive wear on either the offset web 142 or the pattern 73 by the doctor blades 185 and 186 is prevented by reciprocating the blades along the axis of the shaft 187. As shown in Fig. 11, the doctor blades 185 and 186 slidingly embrace the shaft 187 and are normally urged toward the bracket 188 by a spring 195 interposed between the uppermost blade and an enlarged head formation 196 of the shaft. Slidably mounted in the bracket 188 are a pair of pins 197, which are carried by a block 198, slidingly embracing the lower end of the shaft 187. A roller 199, carried by the block, engages a lever 200, pivoted as at 201 to the lower frame member 120 of the decorating unit. This lever is rocked by a cam 202, carried by a gear 203, which engages a roller 204 carried by the lever. The gear and cam unit 203—202 is rotatably mounted on a stud 205 carried by the frame member 120 and is driven by a gear 206 secured to the lower end of the pattern cylinder shaft 146.

The ink removed by the scrapers 185 and 186 falls by gravity onto the lower frame member 120 (Fig. 3) and through suitable openings 193 therein into a pan 194, from where it is returned to the reservoir 174 by a pump mechanism generally indicated at 175.

Ink circulating system

The pump mechanism 175 is best illustrated in Figs. 3 and 11. As there shown, this pump comprises a pair of telescopically arranged tubes 114 and 115. The upper of one of these tubes is secured to a block 116, removably carried by the frame member 120 and telescopically receives one end of a tube 117 which conducts the ink from the pump to the reservoir 174. The lower end of the tube 114 is peened inwardly, as indicated at 118, and is normally closed by a ball 119 slightly less in diameter than the internal diameter of the tube 114. A spring 134 normally maintains the ball 119 in its lowermost position. The lower tube 115 slidingly embraces the tube 114 and its lower end is normally closed by a spring-pressed ball 135. When, however, the tube 115 is raised relatively to the tube 114, ink trapped between the two balls 119 and 135 forces the ball 119 upwardly, compressing the spring 134, permitting such ink to enter the tube 114. When the tube 115 is moved downwardly relative to the tube 114, the spring 134 causes the ball 119 to close the passageway between the tubes 114 and 115, and causes a partial vacuum to be formed in the tube 115. When, however, the ball 135 engages the bottom wall of the pan 194, this partial vacuum causes the ink in such pan to flow into the tube 115. Thus, it will be seen that constant reciprocation of the tube 115 relative to the tube 114 will cause the ink to be drawn upwardly from the pan 194 and returned to the reservoir 174.

The pump tube 115 is reciprocated by the cam 202, heretofore described. As illustrated in Fig. 11, the tube 115 is connected by a link 136, with one arm of a bell crank 137, the other arm of which is provided with a roller 138, which is maintained in constant engagement with the cam 202 by a spring.

Pattern transfer mechanism

The transfer member or belt 142 is best illustrated in Figs. 3, 5, 10, 12 and 13. As there shown, the belt is supported or looped about a pair of rollers 74 and 75. The roller 74 is supported in a bracket formation 76 by a pair of stub shafts 77. The roller 75 is supported by a shaft 78, which is journalled in a yoke 79. This yoke is pivotally connected as at 80 to the bracket 76, the arrangement being such that the yoke 79 may be swung about its pivot to adjust the distance between the two rollers 74 and 75, thereby adjusting the tension of the transfer belt 142. A clamping screw 81 (Fig. 12) passes through an arcuate slot 82 in the bracket 76 and threadingly engages the yoke 79 to secure the yoke in position relative to the bracket, thereby maintaining the transfer belt in adjustment.

The transfer belt is adjustable toward and away from the pattern roll to regulate the pressure therebetween and thereby secure the most advantageous removal of the ink design from the pattern. To this purpose, the bracket 76 is provided at its upward end with a T-shaped head 83, the edges of which are formed to coact with a dovetailed slot 84, formed in the upper frame member 120 of the graining or decorating unit, thus permitting the transfer belt, together with the two rollers to be moved toward and away from the pattern roll to adjust the pressure therebetween, as desired. An adjusting screw serves to maintain the bracket in an adjusted relationship.

The transfer belt is positively driven from the stub shaft in timed relationship with the work progressing sprocket 31. As shown in the drawings, a gear 86 is drivingly secured to the gear 148, heretofore described. This gear 86, through the medium of an idler gear 87, drives a pinion 88, which is secured to the upper supporting shaft 77 of the foremost graining roll 74. To facilitate adjustment of the bracket belt 142 toward and away from the pattern without disturbing the driving connection to the roll 74, the idler gear 87 is mounted on a stud 89 (Fig. 3), and is arranged to be adjustably positioned in an arcuately extending slot 92, in such frame member by a cap screw 91. The frame member 120 is provided with a slot 104, (Figs. 9 and 10) to permit movement of the shaft 77.

Transfer belt

The transfer belt 142 is a continuous looped belt or web. As shown in Figs. 10 and 13, the belt is provided with a base 93, formed of a material such as latex or composition rubber, to which is secured a transfer material 94, such as the usual glue and glycerin compound ordinarily used for transfer members in offset printing processes. It will be noted that the roller 75, which guides the belt 142 into contact with the pattern 140, is provided with a smooth cylindrical surface which maintains the web in even peripheral contact with the pattern. However, the roller 74, which supports the belt for contact with the work W, while being generally cylindrical in form, is peripherally indented or grooved, as at 95 (Fig. 13) in general conformance with the contour or configuration of the work W. The roller 74 has ribs 96 at each side of the central depression, which ribs cooperate with the belt material to deter the slippage of the belt axially on the form roll. Preferably, both ends of the roll are bevelled as at 97 to retard the flow of color along the roll.

Referring to Figs. 3 and 13, it will be noted that the belt is under considerable tension at each side of the work-contacting surfaces and that this tension is gradually reduced toward the region of contact with relatively high portions of the work. Normally, that is, when out of contact with the work, as shown in Fig. 13, the belt does not rest on the undercut surface 95 of the roll 74. It has been found that the belt will decorate such relatively raised and receded surfaces of the work with substantially no distortion of the image or pattern, and since the loop of the belt passing over the roll 74 is carried into the V-shape, unusually sharp curves may be decorated without distortion of the image, all in part of a continuous operation with no slowing down or speeding up at the rounded corners relative to the straight edges of the work.

The transfer belt shown in the drawings has been especially arranged for use with a grooved roller, such as the roller 74, and a true cylindrical roller, such as the roller 75. As shown in Fig. 13, it is to be noted that there is disposed between the rubber or base layer of the belt and the composition or transfer layer of the belt a narrow, continuous, elastic band 98. This band serves to prevent separation between the rubber and the composition laminations of the belt at the point of greatest strain,—that is, at those regions where the belt is normally unsupported by the roll 74.

Also, the band 98 may be of shorter length than the belt, whereby the belt and composition material thereon resemble somewhat an hour glass shape when the belt is under no mechanical tension. This reinforcing web serves to aid in maintaining the contour of the belt depressed about the roller 74, whereby less tension may be required on the belt itself to draw the central region thereof into the annular recess 95 of the roll 74.

General operation

In operation, the operator manually positions the frame or workpiece W on the workholder 21 when the latter is in approximately the position indicated by the dotted line W5 in Fig. 6.

The operator then swings a crank arm 176 to cause the work to be accurately positioned so that the application of the design may start at the same relative point on each workpiece. The crank 176 is secured to a shaft 177, suitably journalled in the frame 10 beneath the table 11. On its inner end, the shaft 177 is provided with a sprocket wheel 178, which, together with a sprocket wheel 179, supports a continuous looped chain 207 with its upper stretch disposed beneath a slotted opening 208 in the table 11. The swinging of the crank in a clockwise direction causes a lug 209 to project through the slot 208, engage the end of the workholder, and progress the workholder together with the work toward the right, until the lug is arrested by a stop 210 which is adjustably positioned on the table 11 by a bolt 211. The movement of the work, due to the driving of the workholder by the sprocket 31, causes or returns the chain lug to the full line position shown in Fig. 1, where it remains until again required to position a frame.

Before the decorating or graining unit is moved into contact with the work, the operator moves a shield 212 into contact with the work. After the fixture or workholder 21 and the shield 212 have been positioned to locate the point on the work, at which the decorating unit is to begin the actual decoration of the work, the handwheel 128 is rotated to move the graining unit downwardly and bring the transfer web into contact with the shield 212. As the hand wheel is rotated a lug 220 carried thereby engages a lever 221, Figs. 1, 2 and 4, rocking such lever about its pivot 222. This lever, through a link 223, rocks a lever 224 counterclockwise (Fig. 1) against the action of a spring 233. The lever 224 is secured to a rod 225, which is journalled in the frame 10 and is connected with a clutch rod 226 by a lever 227. The clutch rod is provided with a pair of collars 228, between which is slidably mounted an arm 229 of a bell crank, the other arm 230 of which rides in an annular groove 231 formed in the clutch member 55. A spring 232 is interposed between the collar 228 and the bell crank arm 229 and serves to transmit the movement of the clutch rod to the bell crank. The movement of the clutch member, due to the rotation of the hand wheel 128, as above described, causes the clutch member 55 to engage the clutch member 54, thereby initiating the rotation of the sprocket 31 and consequently progressing the work W.

From the foregoing, it will be noted that when the transfer web 142 first moves into contact with the work, it first engages the shield 212, but as the work is progressed, the transfer web rides out of contact with the shield and into contact with the work. It will thus be seen that inasmuch as the work-progressing sprocket 31 and the transfer web are accurately geared together, the same part of the design or pattern will be applied to each frame as the transfer web leaves the shield 212. The shield 212 likewise serves to prevent any smudging of the design as the transfer web is moved into contact with the work and it enables the printing pressure between the transfer web and the shield to be gradually increased until the desired maximum pressure is reached. Hence, when contact is made between the work itself and the transfer web, it will be with the most desirable pressure.

As the work progresses, it swings in a clockwise direction (Fig. 6) and shortly before the decorating unit reaches that part of the work to which the design was initially applied, the shield 212 is automatically moved out of contact with the work, and a second shield 213 moved into contact with the decorated work. This permits the web to finish its impression with full printing pressure. After the transfer web has moved from the work onto the shield 213, the hand wheel 128 is moved to withdraw the decorating unit and transfer web from contact with the shield. This again prevents smudging due to the varying of the pressure between the web and the work as the decorating unit is moved away from the table and likewise permits the application of the design through the entire length of the work, without necessitating an overlapping of the design at any point.

It will be noted, from Fig. 5A, that the axis of the transfer web supporting roller 74 does not lie in a vertical plane passing through the axes of the workholder guiding rollers 38 and 40, but is offset therefrom. The amount of offset has been exaggerated in the drawings. Actually, the distance is comparatively small. This offset enables frames having relatively small corner radii to be decorated without danger of distortion of the design which might otherwise result due to a wiping or slipping action between the frame and the decorating unit.

The inner periphery of the workpiece carrier 21, relative to the surfaces of the workpiece W which contact with the carrier, is shaped to permit a restricted relative movement between the workpiece and the carrier during the printing or graining operation, whereby the workpiece, when subjected to movement by the carrier, and to pressure of the offset belt 142, will permit more readily the conforming of the offset belt to the cross-sectional contour of the workpiece, regardless of whether production variations in any single workpiece are present. This relationship is indicated by the dotted lines, representing the workpiece as shown at the right side of the carrier 21 in Fig. 20.

Shield operating mechanism

The shields 212 and 213 and their operating mechanism is best illustrated in Figs. 6, 7 and 7A. The shields 212 and 213 are formed complementary to the work surface and are secured to respective shafts 214 and 215, which are mounted in a bracket 216, carried by the workholder 21. As indicated in Fig. 7, the shafts 214 and 215 are geared together by gears 217 and 218, and it will be noted that the arrangement of this gearing is such that both shields may be moved to an intermediate position, as indicated in dotted lines on Fig. 7, to enable the frame to be removed or positioned on the workholder 21.

The shields 212 and 213 are automatically operated to move the shield 212 from, and the shield 213 into, engagement with the work. This is accomplished by a cam 219, which is secured to the abutment bar 70, heretofore described. As the workholder progresses this cam strikes a lever 234, pivoted as at 235, to the bracket 216. The lever is provided on its inner end with a segmental gear 236, arranged to coact with a gear 237, drivingly secured to the shield shaft 214. The cam and gearing described is such that when the arm 234 engages the cam, the latter causes the shield 212 to be swung to the position indicated in Fig. 7A, and the shield 213 to be swung into a work engaging position.

*Automatic operation*

Figs. 14 to 19, inclusive, show a modified form of mechanism. Many of the parts, however, are identical with those heretofore described in connection with Figs. 1 to 13, and such parts have been given the same reference characters. The modification provides a machine in which the movement of the decorating unit toward and from the work is entirely automatic, the arrangement being such that the only operation performed by the operator is the positioning and removal of work from the workholder 21. The main difference between the modifications shown in Figs. 14 to 19, is the manner in which the various mechanisms are driven. The work table and the graining or decorating unit 20 are substantially the same as heretofore described. The driving mechanism, however, as shown in Figs. 14, 15 and 18 and 19 differs from that heretofore described.

As shown in Fig. 14, the mechanism of the modified form of the invention is driven from the motor M, which, through the medium of a belt 62, drives a worm gear reduction unit 60, as heretofore described. In the modification, however, the driving shaft 59 of the worm gear reduction unit is connected by a drive chain 240, with a clutch member 241, which is rotatably mounted on a shaft 242, journalled in suitable bearings carried by the frame 10. The clutch member 241 is arranged to be selectively engaged by a clutch member 243, splined to the shaft 242 by a key 244. The clutch member 243 is selectively shifted into and out of engagement with the clutch member 241 by one arm 245 of a bell crank which engages an annular groove 246, formed in the clutch member 243. The bell crank is pivoted to the frame 10, as indicated in Fig. 19 at 247 and its other arm 238 is connected by a link 248, with a foot pedal 249, conveniently positioned for use by the operator. A spring 250 normally acts on the arm 238 of the bell crank to maintain the clutch members in active engagement with each other.

The extreme right hand end of the shaft 242 is connected by bevel gearing 251, with a shaft 252, which extends vertically through the column 14. This column has, as shown in Fig. 14, a reduced sleeve portion 253, on which is journalled a bracket 254. The bracket 254, as shown in Fig. 14, supports a tubular member 255, to which the graining unit 20 is connected by suitable bolts 256. It will be noted that the tubular member 255 may be slid axially within the bracket 254 or may be rotated relative thereto, a clamping screw 257 being provided to secure the sleeve in an adjusted position. Extending through the tube 255 is a shaft 258, which is connected by bevel gearing 259, with the vertically extending shaft 252, heretofore mentioned. At its left-hand end the shaft 258 has a splined connection with a gear 269, which, as indicated in Fig. 18, is in constant meshing engagement with a gear 260, rotatively journalled on a shaft 261 carried by the supporting frame 90 of the graining unit. The gear 260 in turn drives a pinion 262 which is drivingly secured to a counter-shaft 263, carried by the frame 90, and which is geared to the graining unit drive shaft 152 by bevelled gearing 264, in the same manner as heretofore described in connection with Fig. 3.

*Modified workholder drive*

The workholder 21 is progressed by a sprocket 31, in the same manner as heretofore described in connection with Fig. 3. In this instance, however, the sprocket is secured to a hollow shaft 265, the lower end of which is secured to a bevelled gear 266, arranged to constantly mesh with a bevelled gear 267, rotatably mounted on the power shaft 242, heretofore mentioned.

*Reciprocation of decorating unit*

In this modification, the decorating unit 20 is automatically moved toward and away from the work. As shown in Figs. 15, 16 and 18, the graining unit frame 120 is supported in the housing or frame 90, in the same manner as heretofore described in connection with Figs. 1 to 13. In this instance, however, the decorating unit is reciprocated in the carriage 90 by a cam 272, which is mounted on a shaft 271 carried by the carriage 90, and operated from the gear 269 heretofore described.

As shown in Figs. 15 and 16 the cam 272 is provided with a cam groove 273, arranged to receive a roller 274, carried by an arm secured to the frame 120 of the decorating unit, as will be hereinafter more fully described. The cam is arranged to move the decorating unit into contact with the work, retaining it there until the entire workpiece has been decorated, and then withdraw it. The cam may be replaced with other cams having a different cam contour, to enable workpieces of different sizes and shapes to be readily decorated by the same mechanism.

*Decorating pressure*

The connection between the roller 274 and the frame 120 of the decorating unit is such that the decorating unit is resiliently urged into contact with the work, but is positively drawn out of contact therefrom. As shown in Fig. 16, the arm which connects the roller with the frame 120 comprises a pair of telescopically arranged members 275 and 276. The member 276 is secured to the frame 120, and has pin and slot connections 278, with the member 275. Interposed between the members 275 and 276 is a compression spring 279. This spring is arranged in such manner that when the cam rotates to move the decorating unit toward the work, the force is applied through the spring. However, when the cam acts to withdraw the decorating unit from the work, it acts positively through the pin and slot connection between the members 275 and 276.

To adjust pressure between the offset web and the work, one end of the spring 279 abuts an adjusting screw 281, which threadingly engages the member 276. The head 280 of this screw is provided with openings 283, adapted to receive a pin, which may be inserted through openings 284, in the member 276.

*Automatic work drive*

As the decorating unit approaches the work, under the influence of the cam 272, power is automatically applied to the sprocket 31, to advance the work. The arrangement is such that the sprocket 31 is rotated slightly before the graining unit strikes the work so as to insure the best possible impression.

As the graining unit approaches the work, the bracket 76, heretofore described, strikes the head 285 of a plunger 286, which is slidably mounted in the hollow shaft 265 which supports the sprocket 31. Continued downward movement of bracket causes the plunger 286 to rock a lever 287 (Fig. 19) about its pivot shaft 288. The lever 287, through a spring 290 interconnected between the lever 287 and a lever 291, rocks the latter lever about the shaft 288. The lever 291 coacts with an annular groove or recess 292, formed in a clutch member 293, which is splined to the shaft 242, as illustrated in Fig. 19. The downward movement of the rod 286 therefore causes the clutch member 293 to engage a clutch formation 294, carried by the gear 261, thereby causing the rotation of the work-progressing sprocket 31. A spring 295 (Figs. 14 and 19) serves to normally maintain the clutch members 293 and 294 disengaged, and to return the parts to their normal position consequent upon the movement of the graining unit 20 away from the work under the influence of the cam 272.

Cam drive

The cam 272 is driven in timed relationship with the movement of the work and with the movement of the decorating web and the pattern roll. As shown in Fig. 18, the gear 260 heretofore described is loosely mounted on the shaft 261, but it is normally maintained in driving engagement therewith by the conical hub 300, of a handwheel 301, which is mounted on a squared end 302 of the shaft 261. A clamp 303 is threadingly mounted on the shaft 261 and manually actuated to uncouple the gear 260 with the shaft, when desired. Drivingly mounted on the shaft 261 is a pinion 305, which meshes with one member 306 of a compound gear unit rotatably mounted on the shaft 263 heretofore mentioned. The other gear member 307 of the compound gear unit is in constant meshing engagement with a spur gear 308. The gear 308 is rotatably mounted on the shaft 261 and is in constant meshing engagement with a gear 310, which is drivingly secured to the cam 272. The gearing 305, 306, 307 and 308 provides the necessary reduction to permit the decorating unit to remain in contact with the work until the belt 142 has decorated the desired length of the workpiece.

The mechanism, just described, permits the operator to control the desired portion of the pattern which is to be applied first to the work. This is accomplished by operating the clamp 303 to disengage the driving connection between the gear 260 and the shaft 261 and thereafter rotating the handwheel manually, to change the relation of the cam to the design carried by the pattern roll. This is, of course, carried out while the main clutch 241, 243, is disengaged. When the proper cam is used, this adjustment, once made, will cause the same portion of the pattern to be applied to the starting point of each frame.

From the foregoing description, it will be seen that we are able to decorate a series of articles with the same design, and in such a way that such design may be located in substantially the same relative position on the workpiece, and wherein the only work required of the operator is to supply the machine with frames or workpieces.

Workholder guides

In Figs. 15 and 17 we are illustrating a modified form of mechanism for retaining the workholder in contact with the surface of the work-supporting table 11. As there shown, the work-supporting table 11 is provided with a pair of diagonally extending slots 320. Slidably mounted in each of these slots is a block 321, provided as shown in Fig. 15 with a vertically extending pin 329 carrying anti-friction roller 322, arranged to bear against the outer periphery 323 of the workholder 21. Each pin 329 supports a second pin 330, which, as shown in Fig. 15, carries a roller 324, arranged as illustrated in Fig. 15, to bear against a horizontal surface 325 of the workholder. Each roller 322 is maintained in contact with the workholders by a weight 326, secured to one end of a cord 327, which passes around a pulley 328, carried by the undersurface of the table 11, and is connected to the respective block 321, as indicated at 331. The rollers 324 are maintained in contact with the workholder by engagement of shoulders 332 of their respective blocks with the under surface of the table 11. When it is desired to remove the workholder from the table the blocks are drawn out of contact therewith by cords or cables 333 (Fig. 17), which pass from respective blocks 321 to a position where they may be conveniently grasped by the operator.

Polishing of work

After the work has been decorated by the application of a design in color, through the use of the mechanism heretofore described, the work is given a protective coating of wear-resisting clear lacquer or some similar substance, and such coating polished by the application of a coating of polish while rubbing the article. We find it a decided advantage to utilize a mechanism constructed in such a manner that the operation performed thereby will simulate as closely as practical the operations performed during the application of the decorative coating. For this reason, the work-decorating mechanism is constructed in such a manner that a polishing unit is to be substituted for the decorating unit. Such a mechanism is shown in Fig. 20. As there shown, the decorating unit 20 has been removed from the carriage 90, and a polishing unit 25 has been substituted therefor.

The polishing unit is mounted in a frame 350, which is supported on the gibs 124 of the carriage 90 by rollers 351, in the same manner as heretofore described in connection with the graining unit. Slidably mounted in the frame 350 is a roller assembly comprising rollers 74a and 75a. The roller 74a is mounted in a bracket 76a which is slidably mounted in the frame 350, as heretofore described in connection with the bracket 76 and the frame 120, similarly the roller 75a is rotatably mounted in a bracket member 79a. The rolls 74a and 75a are provided with peripheral grooves corresponding in shape to the contour of the work, as indicated in Fig. 20. These rolls support a polishing web 352, which is moved into and out of contact with the work resting on the workholder 21 in the same manner as the decorating unit of Fig. 15. The polishing web 352 is preferably driven at a comparatively high rate of speed. To this end we mount a motor 355 on the frame 350, and drivingly connect the roll 75a with this motor by a driving belt 356. Thus, it will be seen that we are able to polish the decorated work by a mechanism, the movements of which are substantially identical with the mechanism which was utilized to decorate such work. This, therefore, enables us to make the same provision for irregularities in the work as was done in the graining operation, thereby permitting the polishing of the protecting coating without damage to the decorated coating or without producing undesired light reflection effects, due to variations in the work itself.

The polishing web or belt 352 is provided with a liquid polish. This polish is supplied by a pump similar to the ink recirculating pump 175, heretofore described. Such pump may be carried by the frame 350 and operated by a suitable cam carried by the carriage 90. However, a gravitational system, such as shown in Fig. 20, may be utilized. The latter system comprises a reservoir 357 carried by the frame 350, and provided with a conduit or tube 358, to conduct the fluid to the polishing belt 325. A valve 359 may be inserted in the conduit 358 to control the amount of fluid supplied to the polishing belt.

In Fig. 20 we have omitted from the frame 90 those parts which are unessential to the operation of the polishing mechanism. However, it is to be understood that such parts, as, for instance, the shaft 152 and its associated mechanism which normally serves to drive the graining rolls, may remain in position in the mechanism, as they have been omitted from Fig. 21, to simplify the drawings.

Work positioning mechanism

In describing the general operation of the machine, one form of work positioning mechanism was described. Such mechanism moved the workholder in a direction opposite to its normal direction of movement to enable the decorating unit to be brought into contact with a predetermined point on the work. In Figs. 22 to 23 there is shown a modified form of such positioning mechanism. The operation of such mechanism is as follows: The operator places the work on the workholder, as heretofore described, and then, grasping a handle 450, rocks it about a shaft 451 which is supported in axial alignment with the drive shaft 242, (Fig. 15). In grasping the handle, the operator depresses a lever 53, pivoted at 454 to the handle and forces a pawl 455, carried by the handle, into engagement with a ratchet 456 which is drivingly secured to the shaft 451. The rocking of the handle therefore imparts a rotary movement to the shaft 451. A bevel gear 457, drivingly carried by such shaft 451, and meshing with the bevel gear 266 (Fig. 15) transmits this movement to the shaft 265 and hence to the workholder driving sprocket 31. Thus driving the workholder positively. The ratchet 456 is arranged to drive the mechanism so that the sprocket 31 will rotate in a direction which is opposite to its normal direction of rotation under influence of the motor drive mechanism, heretofore described. Thus enabling the operator to position the starting point of the application of the decoration to the work, as desired. Suitable marks, as, for instance, lines 460 and 461 on the shield and the abutment 70, may be provided to facilitate accurate positioning.

We claim:

1. A work decorating machine having a frame provided with a work supporting surface, a support overhanging said surface and movable in substantially any direction in a plane parallel with the plane of the supporting surface, a work decorating unit including a printing mechanism depending from said support and having a pivotal connection therewith for movement in a plane extending normal to the plane of said surface.

2. A work decorating machine having a frame provided with a work supporting surface, a work progressing means carried thereby, a support overhanging said surface and movable in a plane parallel therewith, a work decorating unit including a printing mechanism depending from said support and including a rotary decorating member, said unit having a pivotal connection with said support to permit movement of the workholder in a plane extending normal to the plane of said surface, driving means carried by said frame, and a power transmission mechanism interconnecting the driving means, the rotary member, and the work progressing means.

3. A work decorating machine, having a frame provided with means to support a workpiece, a carriage, a work decorating unit having a sliding connection with said carriage for movement in one plane, said decorating unit including a printing mechanism, a support for said carriage having a pivotal connection with said frame for movement about one axis and having a pivotal connection with said carriage for movement about an axis extending in a direction normal to the direction of first-named axis, and means to move the work decorating unit bodily in a plane extending normal to the direction of the first-named plane, driving means carried by said frame, and mechanism interposed between the driving mechanism and the decorating unit to drive said unit in any of its various positions.

4. A work decorating machine, having a frame provided with a substantially horizontally extending work supporting surface, a carriage, a work decorating unit, having a sliding connection with said carriage to enable the unit to be moved to and from the work supporting surface, said decorating unit including a printing mechanism, a support for said carriage having a pivotal connection with said frame and a pivotal connection with said carriage, and carriage supporting means permitting movement of the work decorating unit bodily in a plane substantially parallel with said work supporting surface, driving means carried by said frame and mechanism interposed between the driving mechanism and the decorating unit to drive said unit in any of its various positions.

5. A work decorating machine having a frame provided with a planular surface to movably support a workpiece, a work decorating unit adapted and arranged to transfer a design in color to the work, a supporting member therefor, a connection between the frame and the supporting member arranged and adapted to permit movement of the decorating unit in any direction in a plane parallel with the plane of said surface, and connections between the decorating unit and the support to permit movement of the decorating unit in any direction in a plane extending normal to the first-named plane.

6. A work decorating machine having a frame provided with work supporting surface, a support pivotally mounted on said frame and overhanging said surface, a carriage slidably mounted on said support for movement in one direction relative to the support and pivotally connected thereto for movement about an axis extending in a direction substantially normal to the direction of the axis of the pivotal connection between the support and the frame, a work decorating unit slidably mounted on said carriage for movement in a direction substantially normal to the direction of the sliding movement between the carriage and the support, said decorating unit comprising a pattern roll, means to supply color thereto, a rotary transfer member, a motor carried by said frame and a positive driving connection between said motor, the pattern roll and the transfer member.

7. A work decorating machine having a frame provided with a work supporting surface, a support overhanging said surface and movable in a plane parallel therewith, a work decorating unit depending from said support and having a pivotal connection therewith for movement in a plane extending normal to the plane of said surface, said decorating unit including means to transfer a design in color to the work, a connection between the decorating unit and the support to permit reciprocation of the unit relative to the supporting surface, and power actuated means to cause such reciprocation.

8. A work decorating machine having a frame provided with work supporting surface, a support pivotally mounted on said frame and overhanging said surface, a carriage slidably mounted on said support for movement in one direction relative to the support and pivotally connected thereto for movement about an axis extending in a direction substantially normal to the direction of the axis of the pivotal connection between the support and the frame, a work decorating unit slidably mounted on said carriage for movement in a direction substantially normal to the direction of the sliding movement between the carriage and the support, said decorating unit comprising a pattern roll, means to supply color thereto, a transfer belt, a pair of spaced rollers supporting said belt and moveable as a unit or from said pattern roll, one of said rollers being moveable to and from the pattern roll independently of the other roller, a motor carried by said frame and a positive driving connection between the motor and said rolls, and means actuated by said motor to reciprocate the work decorating unit in the carriage.

9. A machine for decorating a workpiece having a plurality of courses at an angle to each other, a workholder provided with a guide conforming in general to the courses of the work, a support on which said workholder may move, a pair of rollers carried by said support and coacting with opposite sides of said guide to grip the workholder therebetween, means to positively advance the work between said rollers, and a rotary decorating member arranged and adapted to transfer a design to the work as it passes between the axis of said rollers.

10. A machine for decorating a workpiece having a plurality of courses at an angle to each other, a workholder provided with a guide having courses substantially conforming to the courses of the work, a planular support for said workholder, guide means carried by said support and coacting with the workholder guide to limit the movement of the workholder while permitting the workholder to swing in a plane parallel to the plane of support, a rack on said support, a gear carried by said support in driving engagement with said rack, means to drive said gear to advance the work, a rotary decorating member arranged and adapted to transfer a design to the work as it passes the guide means, and a positive driving connection between said gear and the rotary decorating member.

11. A machine for decorating a workpiece having a plurality of courses at an angle to each other, a workholder provided with a substantially narrow guide having a pair of spaced guides each having courses substantially conforming to the courses of the work, a planular support for said workholder, a pair of rollers carried by said support and coacting with respective guides to grip the workholder therebetween, a rack on said workholder, a gear member having its axis in substantial alignment with one of said rollers and in driving engagement with said workholder, means to drive said gear member to advance the work between said rollers, and a rotary decorating member arranged and adapted to transfer a design to the work as it passes between the axis of said rollers.

12. A machine for decorating a workpiece having a plurality of courses at an angle to each other, a workholder provided with a guide having courses substantially conforming to the courses of the work, a support for said workholder, a pair of rollers carried by said support and arranged and adapted to grip the guide therebetween, a rack on said guide having a pitch line conforming substantially to the courses of the work, and driving means having a positive driving connection with said rack to progress said workholder, a rotary work decorating member arranged and adapted to decorate the work as it passes between said rollers, and means to operate said driving means and said decorating member in synchronism with each other.

13. A work decorating machine, having a frame provided with a work supporting surface, a workholder adapted to slide over said surface, a pair of rollers coacting with oppositely facing surfaces of said workholder to guide its movement, and a flexible band resiliently supported by said frame and coacting with the workholder to maintain it in contact with the supporting surface.

14. In a work decorating machine, the combination of a work support on which a workpiece having portions extending in at least two divergent planes substantially normal to the work support may float, means supporting one side of the work at the region to be decorated, propelling means on the opposite side at said region, a positive driving connection between said propelling means and the work, and a decorating means adapted and arranged to decorate the work in synchronism with said propelling means.

15. In a machine for decorating linear surfaces of workpieces having linear contours to be decorated, which deviate from a common plane, a carrier having guide means provided with a linear contour substantially conforming to the general linear contour of the workpiece to be decorated, a support on which said carrier is free to swing in a plane parallel with the general plane of the workpiece, a rack having a pitch line substantially conforming to the linear contour of the work on said guide, a sprocket carried by said support and engaging said rack, means acting on said guide to maintain the rack in engagement with the sprocket, power means to rotate said sprocket to advance the work, and a decorating unit adjustably supported above the work supporting surface, and adapted to decorate the work as it is advanced, and a common operating mechanism for the sprocket and the decorating unit.

16. A machine for decorating lineal surfaces of frames, comprising a workholder adapted to receive a frame, said workholder having a guide substantially conforming in linear contour to the surfaces of the frame to be decorated, a planular supporting surface for said workholder, a pair of rollers carried by said surface with their axis in a common plane and adapted to coact with oppositely facing surfaces of said guide, means to positively progress the workholder between said rollers, and a decorating unit including a rotary decorating member positioned with its axis in a plane intersecting the axis of said rollers to transfer a design in color to the work as the workholder is progressed between said rollers, and power operated means to drive the rotary decorating member in timed relationship with the work progressing means.

17. A frame decorating machine, comprising a workholder on which the frame to be decorated may be positioned, a support on which the workholder may be moved, a guiding and supporting roller on the support to operatively engage one surface of the work-holder, a decorating unit having a design applicator thereon adapted to operate in rolling contact with the work at a point substantially opposite the roller, power means to progress the frame, and a flexible band resiliently retained in contact with those surfaces of the workholder remote from the roller to maintain the workholder in contact with its supporting surface and minimize the irregularity of the progress of the work.

18. In a surface decorating machine a workholder, a decorating unit having a design applicator adapted to operate in rolling contact with the work, means to initially position the workholder relative to the decorating unit, power means to thereafter progress the workholder past the decorating unit to cause the work to be decorated, and means acting consequent upon the movement of the workholder by said power means to return the first-named means to an inactive position.

19. In a decorating machine of the class described, a work supporting surface, power-operated mechanism to advance the work, a decorating unit having a member adapted to transfer a design to the work by a relative rolling movement, means to drive said member in synchronism with the work advancing means, said decorating unit being mounted for movement toward and from the work, and means to connect the power operated mechanism to automatically advance the work consequent upon movement of the decorating unit toward the work.

20. In a decorating machine of the class described, a work supporting surface, power operated mechanism to advance the work, a decorating unit having a member adapted to transfer a design to the work by a relative rolling movement, means to drive said member in synchronism with the work advancing means, said decorating unit being mounted for movement toward and from the work, and means actuated automatically consequent upon movement of the decorating mechanism from the work to disconnect the work advancing mechanism from the work.

21. In a decorating machine of the class described, a work supporting surface, power operated mechanism to advance the work, a decorating unit having a member adapted to transfer a design to the work by a relative rolling movement, means to drive said member in synchronism with the work advancing means, said decorating unit being mounted for movement toward and from the work, means to automatically connect the power-operated mechanism to advance the work consequent upon movement of the decorating unit toward the work, and means actuated consequent upon movement of the decorating mechanism from the work to disconnect the advancing mechanism from the work.

22. In a decorating machine, a work-supporting surface, a work-decorating unit mounted for movement toward and away from the work-supporting surface, power operated mechanism to periodically reciprocate said unit, power-operated means adapted and arranged to be selectively connected to advance the work on said surface, means acting automatically to connect the power means to advance the work consequent upon the movement of the decorating unit toward the work, and means actuated automatically consequent upon movement of the decorating mechanism from the work to break said connection.

23. A machine for decorating work pieces having at least two straight surfaces joined by a curvilinear surface, comprising a work holder having guide surfaces substantially conforming to the surfaces of the work, a planular supporting surface therefore, a comparatively straight surfaced elongated abutment pivoted at one end to said supporting surface and resiliently supported at its other end, means coacting with the work holder to maintain it in contact with said abutment, means engaging a surface of the work holder opposite said abutment to progress the work holder advancing one straight edge thereof along said abutment and swinging the other straight surface into contact therewith while maintaining constant contact between said abutment and at least one point of the work holder, and a decorating unit positioned relative to the work supporting surface and arranged and adapted to apply a decorative coating to the work as it progresses along said buttress.

24. A machine for decorating the top and inner surfaces of a frame structure comprising a plurality of side members joined by curvilinear corner members, comprising a work holder having a guide rail having inner and outer parallel guide surfaces substantially conforming in direction and extent to the inner surfaces of said frame, and having a planular bottom surface extending in a direction normal to said guide surfaces, a substantially horizontally supporting table for said work holder, an elongated abutment pivoted at one end to said table and resiliently supported at its other end, a roller arranged to engage the inner surface of the work holder guide, whereby the guide may be gripped between said roller and said abutment, means engaging said work holder to retain it in sliding contact with said table, a rack on said work holder, a gear mounted on said table concentric to said roller and adapted to coact with said rack to progress said work holder, a work decorating mechanism adapted and arranged to apply a decorative transfer to surfaces of the work to be decorated by a relative rolling action, means whereby said mechanism may be moved toward the work at an obtuse angle to the surface to be decorated and in a vertically extending plane substantially normal to the abutment, and means to drive the decorating mechanism and the work progressing mechanism positively and in synchronism with each other.

25. A work decorating machine having a support for work to be decorated, mechanism adapted and arranged to apply a decorative transfer to work on said support, said mechanism being movable toward and away from the support at an obtuse angle to said support and in the direction transverse to the direction of applying such transfer, a cam arranged and adapted to move the said mechanism into resilient contact with said work, and a common operating means for said cam and said work progressing means.

26. A work decorating machine having a work support, mechanism including a flexible transfer belt and cooperating pattern element to apply a decorative transfer to the work on the support, said mechanism being movable toward the support at an obtuse angle transverse to the direction of transfer application, said mechanism having a pivotal connection with said support, said pivotal connection arranged and adapted to permit the mechanism to be swung about an axis extending normal to said support and remote from the point of application of the decorative transfer to the work.

27. A machine to decorate work pieces having lineal surfaces deviating from a straight line comprising a stationary supporting surface, means to guide progressively advanced points of the surface of the work to be decorated past a point fixed relative to the supporting surface while permitting the work to swing substantially thereabout, continuously acting means to positively progress the work, a decorating unit adapted to apply a decorative coating to the work substantially at said point.

28. A machine to decorate work pieces having lineal surfaces deviating from a straight line, comprising a stationary supporting surface, means to guide progressively advanced points of the surface of the work to be decorated past a point fixed relative to the supporting surface while permitting the work to swing substantially thereabout, means to positively progress the work, a decorating unit adapted to progressively apply a decorative coating to the work at a fixed point adjacent to but offset from the first named point.

29. In a decorating machine a work holder, a table having a substantially flat surface for supporting the work holder, a decorating unit including a resilient transfer member and a support therefore, means interconnecting the table with the decorating unit, power operated means to periodically move the decorating unit toward the work to effect the decoration of the work and to move the unit away from the work after the decoration of the work has been completed, means to advance the work and means actuated by the approach of said unit toward the work to cause the work advancing means to become active.

30. A work decorating machine having a work support, mechanism including a flexible polishing belt, a driving motor therefore, and means to apply polish to said belt, said mechanism being movable toward the support at an obtuse angle transverse to the direction of polish application, said mechanism having a pivotal connection with said support, said connection arranged and adapted to permit the mechanism to be swung about an axis extending normally to said support and remote from the point of application of the polish to the work.

LLOYD V. CASTO.
GUIDO von WEBERN.
EDWARD W. HAMANT.
ORVILLE DOERING KING.